US007634136B2

(12) United States Patent
Kawamoto et al.

(10) Patent No.: US 7,634,136 B2
(45) Date of Patent: Dec. 15, 2009

(54) TOUCH INPUT PROGRAM AND TOUCH INPUT DEVICE

(75) Inventors: Koichi Kawamoto, Kyoto (JP); Yoshinori Katsuki, Kyoto (JP); Shinji Kitahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 780 days.

(21) Appl. No.: 11/299,822

(22) Filed: Dec. 13, 2005

(65) Prior Publication Data

US 2006/0214924 A1 Sep. 28, 2006

(30) Foreign Application Priority Data

Mar. 24, 2005 (JP) ............... 2005-085639

(51) Int. Cl.
*G06K 9/00* (2006.01)
*G06K 9/20* (2006.01)
*G09G 5/00* (2006.01)

(52) U.S. Cl. ................. 382/187; 382/312; 345/156; 463/36

(58) Field of Classification Search ......... 382/173–179, 382/181, 185–189, 312–316, 321; 345/156–158, 345/169–179; 463/30, 36–40
See application file for complete search history.

(56) References Cited

U.S. PATENT DOCUMENTS

| 5,050,221 A | * | 9/1991 | Ohta et al. | 382/177 |
|---|---|---|---|---|
| 5,063,600 A | * | 11/1991 | Norwood | 382/186 |
| 5,237,651 A | * | 8/1993 | Randall | 715/776 |
| 5,257,074 A | * | 10/1993 | Kamei | 382/187 |
| 5,467,102 A |  | 11/1995 | Kuno et al. | |
| 5,546,538 A | * | 8/1996 | Cobbley et al. | 709/203 |
| 5,550,938 A | * | 8/1996 | Hayakawa et al. | 382/313 |
| 5,589,856 A | * | 12/1996 | Stein et al. | 345/173 |
| 5,668,570 A | * | 9/1997 | Ditzik | 345/173 |
| 5,706,030 A | * | 1/1998 | Ishigami et al. | 345/168 |
| 5,724,457 A | * | 3/1998 | Fukushima | 382/311 |
| 5,732,152 A | * | 3/1998 | Sakai et al. | 382/189 |
| 5,847,698 A | * | 12/1998 | Reavey et al. | 345/173 |
| 5,949,408 A | * | 9/1999 | Kang et al. | 345/169 |
| 6,034,685 A | * | 3/2000 | Kuriyama et al. | 715/784 |
| 6,088,025 A | * | 7/2000 | Akamine et al. | 345/175 |
| 6,459,424 B1 | * | 10/2002 | Resman | 345/173 |
| 6,552,719 B2 | * | 4/2003 | Lui et al. | 345/179 |

(Continued)

FOREIGN PATENT DOCUMENTS

JP 5-501023 2/1993

(Continued)

OTHER PUBLICATIONS

Office Action issued Aug. 12, 2008 in corresponding Japanese Application No. 2005-085639.

*Primary Examiner*—Manav Seth
(74) *Attorney, Agent, or Firm*—Nixon & Vanderhye PC

(57) ABSTRACT

A game apparatus includes a CPU core. In response to a setting of a reverse input mode, the CPU core reverses vertically and horizontally BG/OBJ data corresponding to a question, and displays on an LCD an image based on the reversed BG/OBJ data. When a handwriting input operation associated with the image is accepted by a touch panel, the CPU core displays on the LCD an image based on handwriting input data corresponding to the accepted handwriting input operation.

13 Claims, 11 Drawing Sheets

U.S. PATENT DOCUMENTS

| | | | |
|---|---|---|---|
| 6,661,920 B1 * | 12/2003 | Skinner | 382/187 |
| 6,822,635 B2 * | 11/2004 | Shahoian et al. | 345/156 |
| 2005/0164784 A1 * | 7/2005 | Yamamoto et al. | 463/30 |
| 2006/0183505 A1 * | 8/2006 | Willrich | 455/566 |

FOREIGN PATENT DOCUMENTS

| | | |
|---|---|---|
| JP | 5-73203 | 3/1993 |
| JP | 6-83779 | 3/1994 |
| JP | 9-97311 | 4/1997 |
| JP | 2000-505220 | 4/2000 |
| JP | 2002-23938 | 1/2002 |
| JP | 2002-215304 | 8/2002 |
| WO | WO 91/05327 | 4/1991 |
| WO | WO 97/45794 | 12/1997 |
| WO | WO 01/71518 | 9/2001 |

* cited by examiner (A) NORMAL INPUT MODE: RIGHT-HANDED (B) REVERSE INPUT MODE: LEFT-HANDED (A)

OBJ (BG) DATA
HORIZONTAL REVERSE FLAG: 0
VERTICAL REVERSE FLAG: 0

(B)

OBJ (BG) DATA
HORIZONTAL REVERSE FLAG: 1
VERTICAL REVERSE FLAG: 0

(C)

OBJ (BG) DATA
HORIZONTAL REVERSE DATA: 1
VERTICAL REVERSE DATA: 1

(A)

(B)

$x' = xmax - x$
$y' = ymax - y$ (A)

(B)

(A)

INPUT COORDINATES
(x1, y1)
(x2, y2)
(x3, y3)
(x4, y4)
...

(B)

CONVERTED COORDINATES
(x1', y1')
(x2', y2')
(x3', y3')
(x4', y4')
...

$$\begin{cases} x' = xmax - x \\ y' = ymax - y \end{cases}$$

TOUCH INPUT PROGRAM AND TOUCH INPUT DEVICE

CROSS REFERENCE TO RELATED APPLICATION

The disclosure of Japanese Patent Application No. 2005-85639 is incorporated herein by reference.

TECHNICAL FIELD

The exemplary embodiments disclosed herein relate to a touch input program and a touch input device. More specifically, the exemplary embodiments disclosed herein relate to a touch input program and a touch input device that accept an input operation associated with an image shown in a display, through a touch panel.

BACKGROUND AND SUMMARY

Known as this type of conventional device is one disclosed in Japanese Patent Laying-open No. 2002-215304 laid-open on Aug. 2, 2002. This prior art includes a liquid crystal panel with a touch panel. In general, this panel displays such images as icons, dialog boxes, etc. on the left side in order to prevent those images from being hidden from view by the user's right hand. When the left-handed mode is selected, the coordination system of the liquid crystal panel is rotated by 180 degrees, and also the coordination system of the touch panel provided on the liquid crystal panel is turned by 180 degrees. That is, a left-handed operator performs an input operation with the main body that is rotated by 180 degrees, that is, is turned upside down. This improves the usability of this device for a left-handed operator.

Meanwhile, some touch panels accept not only selection of a desired icon, option or the like from the liquid crystal panel but also a handwriting input operation of an arbitrary character. However, the conventional art does not support this handwriting input technique at all.

To be more specific, when handwriting input is performed by means of a touch panel, a touch trace captured by the touch panel is usually displayed on the liquid crystal panel. However, if handwriting input is attempted on the liquid crystal panel with a touch panel of this prior art, a touch trace will be turned upside down in the left-handed mode. Therefore, this prior art is unlikely to allow an accurate handwriting input operation.

Therefore, it is a feature of certain exemplary embodiments to provide a novel touch input program and a touch input device.

It is another feature of certain exemplary embodiments to provide a novel touch input program and a touch input device that allow even a left-handed operator to perform an accurate handwriting input operation.

A storage medium according to certain exemplary embodiments is a storage medium storing a touch input program to be executed by a processor of a touch input device having a first display and a second display arranged on respective left and right sides with respect to a predetermined axis and a touch panel provided on the second display. The touch input program comprises a setting step, a determining step, a first reversing step, a first accepting step and a second displaying step.

In the setting step, a reverse input mode is set in response to a predetermined operation. In the determining step, it is determined whether or not the reverse input mode is set in the setting step. In the first reversing step, first character data is reversed vertically and horizontally when result of determination in the determining step is affirmative. In the first displaying step, an image is displayed on the first display based on the first character data reversed in the first reversing step. In the first accepting step, a handwriting input operation associated with the image displayed in the first displaying step is accepted through the touch panel. In the second displaying step, an image based on handwriting input data corresponding to the handwriting input operation accepted in the first accepting step is displayed on the second display.

The touch input apparatus of certain exemplary embodiments has the first display (12) and the second display (14) arranged on respective left and right sides with respect to the predetermined axis (Y) and the touch panel (20) provided on the second display.

A processor (42) of the touch input device executes the touch input program according to the certain exemplary embodiments described herein. As a result, the reverse input mode is set in the setting step (S1) in response to a predetermined operation. It is determined in the determining step (S3) whether the reverse input mode is set or not in the setting step. In the first reversing step (S11), the first character data is reversed vertically and horizontally when the result of determination in the determining step is affirmative. The image based on the first character data reversed in the first reversing step is displayed on the first display in the first displaying step (S13). The handwriting input operation associated with the image displayed in the first displaying step is accepted in the first accepting step (S17) through the touch panel. The image based on the handwriting input data corresponding to the handwriting input operation accepted in the first accepting step is displayed on the second display in the second displaying step (S19).

According to the certain exemplary embodiments, in response to the setting of the reverse input mode in the setting step, the first character data is reversed vertically and horizontally in the first reversing step, and the image based on the reversed first character data is displayed on the first display in the first displaying step. In this manner, when the handwriting input operation associated with the image displayed in the first displaying step is accepted in the first accepting step through the touch panel, the image based on the input handwriting input data, that is, based on the unreversed handwriting input data is displayed on the second display in the second displaying step. Thus, the touch trace will never be displayed upside down on the game apparatus that is turned upside down. This allows a left-handed operator to perform an accurate handwriting input operation.

The storage medium according to certain exemplary embodiments further comprises a second reversing step and a first processing step. In the second reversing step, handwriting input data corresponding to the handwriting input operation accepted in the first accepting step is reversed vertically and horizontally. In the first processing step, a character recognition process is executed based on the handwriting input data reversed in the second reversing step.

In certain exemplary embodiments, the handwriting input data corresponding to the handwriting input operation accepted in the first accepting step is reversed vertically and horizontally in the second reversing step (S19). The character recognition process is executed based on the handwriting input data reversed in the second reversing step in the first processing step (S23).

According to certain exemplary embodiments, since the character recognition process is performed on the basis of the reversed handwriting input data, it is possible to carry out character recognition appropriately.

The storage medium according to certain exemplary embodiments further comprises a third reversing step and a third displaying step. In the third reversing step, second character data corresponding to the character information recognized by the process of the first processing step is reversed vertically and horizontally. In the third displaying step, an image based on the second character data reversed in the third reversing step is further displayed on the first display.

In certain exemplary embodiments, the second character data corresponding to the character information recognized by the process of the first processing step is reversed vertically and horizontally in the third reversing step (S27). The image based on the second character data reversed in the third reversing step is further displayed on the first display in the third displaying step (S29).

According to certain exemplary embodiments, in response to the setting of the reverse input mode, the second character data corresponding to the recognized character information is reversed, and the image based on the reversed second character data is further displayed on the first display. This makes it easy to verify whether or not the handwriting input operation is accurate and whether or not the second character is suitable for the first character.

A storage medium according to certain exemplary embodiments, the touch input program further comprises a fourth displaying step, a second accepting step, a fifth displaying step, a second processing step, and a sixth displaying step. In the fourth displaying step, an image based on the first character data is displayed on the first display when the result of determination in the determining step is negative. In the second accepting step, a handwriting input operation associated with the image displayed in the fourth displaying step is accepted through the touch panel. In the fifth displaying step, an image based on the handwriting input data corresponding to the handwriting input operation accepted in the second accepting step is displayed on the second display. In the second processing step, the character recognition process is performed based on the handwriting input data corresponding to the handwriting input operation accepted in the second accepting step. In the sixth displaying step, an image based on the third character data corresponding to the character information recognized by the process of the second processing step is further displayed on the first display.

In certain exemplary embodiments, the image is displayed in the fourth displaying step (S37) based on the first character data when the result of determination in the determining step is negative. The handwriting input operation associated with the image displayed in the fourth displaying step is accepted in the second accepting step (S41) through the touch panel. The image based on the handwriting input data corresponding to the handwriting input operation accepted in the second accepting step is displayed on the second display in the fifth displaying step (S43). The character recognition process based on the handwriting input data corresponding to the handwriting input operation accepted in the second accepting step is executed in the second processing step (S45). The image based on the third character data corresponding to the character information recognized by the process of the second processing step is further displayed on the first display in the sixth displaying step (S49).

According to certain exemplary embodiments, the right-handed operator can perform an appropriate handwriting input operation without any predetermined operation.

In addition, certain exemplary embodiments allow the left-handed operator to perform an accurate handwriting input operation on the touch input device in the upside-down state, as in the case of the exemplary embodiments of claims 1 to 4.

Moreover, certain exemplary embodiments allow the left-handed operator to perform an accurate handwriting input operation on the touch input device in the upside-down state, as in the case of other exemplary embodiments.

According to certain exemplary embodiments, it is possible even for the left-hander to perform an accurate handwriting input operation by turning the touch input device upside down.

The above described features, aspects and advantages of the exemplary embodiments described herein will become more apparent from the following detailed description when taken in conjunction with the accompanying drawings.

BRIEF DESCRIPTION OF THE DRAWINGS

FIG. 4 (B) is an illustrative view showing an example of LCD display in a reverse input mode;

DETAILED DESCRIPTION

Figure 1:
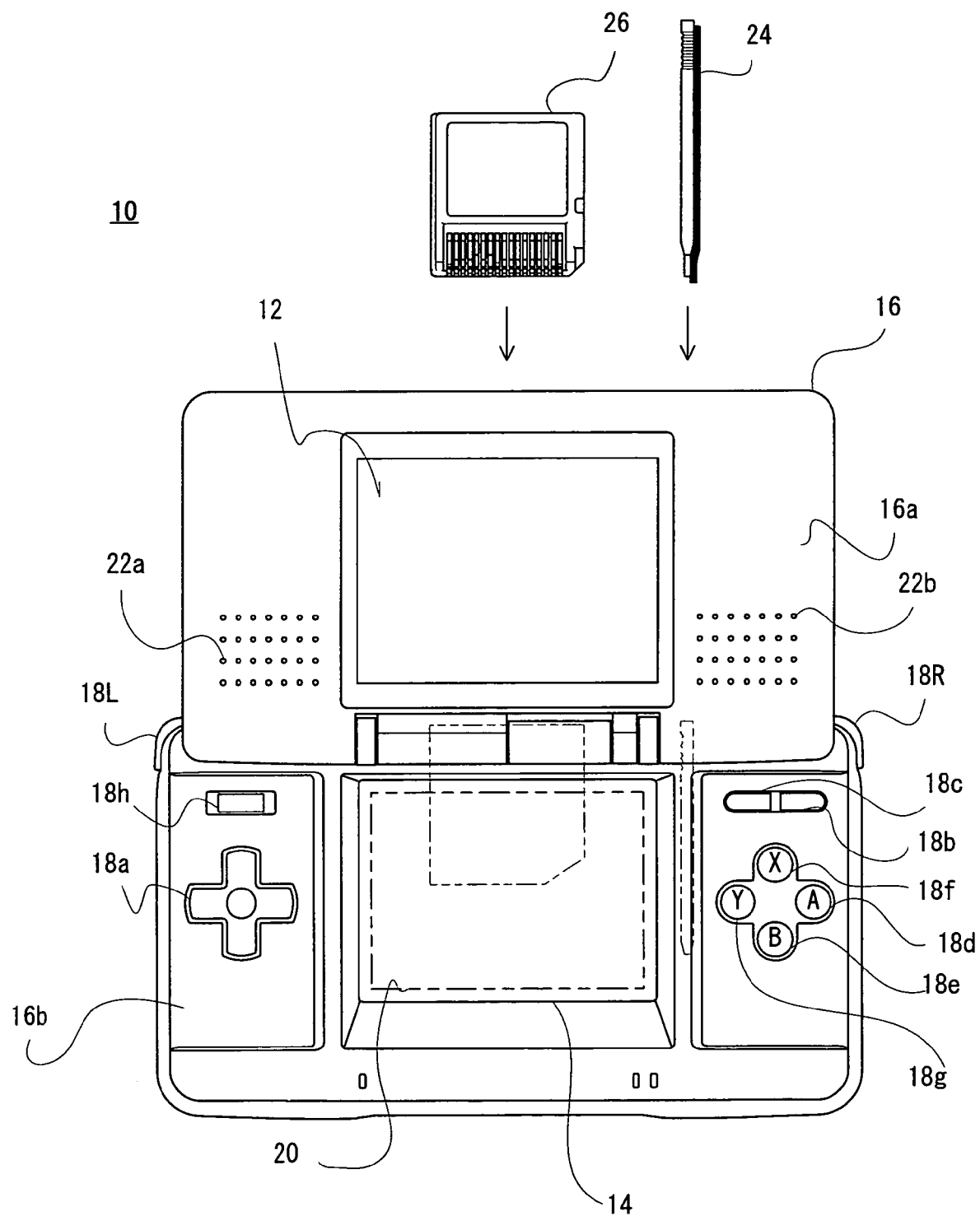
FIG. 1 is an illustrative view showing an external appearance of an exemplary embodiment.

Referring to FIG. 1, a game apparatus 10 of a certain exemplary embodiment includes a first liquid crystal display (LCD) 12 and a second LCD 14. The LCD 12 and the LCD 14 are stored in a housing 16 so as to be arranged in predetermined positions. In this embodiment, the housing 16 is formed by an upper housing 16a and a lower housing 16b. The LCD 12 is stored in the upper housing 16a while the LCD 14 is stored in the lower housing 16b. Accordingly, the LCD 12 and the LCD 14 are closely arranged so as to be longitudinally (vertically) parallel with each other.

Although the LCD is utilized as a display in this embodiment, an EL (Electronic Luminescence) display, a plasma display, etc. may be used in place of the LCD.

As can be understood from FIG. 1, the upper housing 16a has a plane shape larger in size than a plane shape of the LCD 12, and has an opening formed so as to expose a display surface of the LCD 12 from one main surface thereof. On the other hand, the lower housing 16b has a plane shape similar in size to the upper housing 16a, and has an opening formed at an approximately lateral center thereof so as to expose a display surface of the LCD 14. Furthermore, the upper housing 16a is provided with a sound release hole 22a on the right side and a sound release hole 22b on the left side in a symmetrical manner so that the LCD 12 is located between these holes. In addition, an operating switch 18 (18a, 18b, 18c, 18d, 18e, 18f, 18h, 18g, 18L and 18R) is arranged on the housing 16.

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, the upper housing 16a is rotated and folded in such a manner that the display surface of the LCD 12 and the display surface of the LCD 14 are face to face with each other. This makes it possible to prevent damage such as flaws from being caused to the display surface of the LCD 12 and the display surface of the LCD 14. Besides, the upper housing 16a and the lower housing 16b may be provided integrally (fixedly) to form the housing 16, instead of being rotatably connected with each other.

The operating switch 18 includes a direction instructing switch (cross switch) 18a, a start switch 18b, a select switch 18c, an action switch (A button) 18d, an action switch (B button) 18e, an action switch (X button) 18f, an action switch (Y button) 18g, a power switch 18h, an action switch (L button) 18L, and an action switch (R button) 18R. The switches 18a and 18h are positioned at the left of the LCD 14 on one main surface of the lower housing 16b. Also, the switches 18b to 18g are positioned at the right of the LCD 14 on the one main surface of the lower housing 16b. In addition, the switches 18L and 18R are placed at the left and right sides on a part of upper end (top surface) of the lower housing 16b outside a connection part with the upper housing 16a so that the connection part is located therebetween.

A direction designating switch 18a functions as a digital joystick, and is utilized for designating a moving direction of a player character (or player object) capable of being operated by a player, designating a moving direction of a cursor and so forth by operating one of four depression portions. The start switch 18b is formed by a push button and utilized for starting (restarting) and temporarily stopping (pausing) a game, and so forth. The select switch 18c is formed by a push button and used for selecting a game mode, etc.

The action switch 18d, i.e. the A button is formed by a push button, and allows the player character to perform an arbitrary action other than direction designation, such as hitting (punching), throwing, holding (obtaining), riding, jumping, etc. For example, in an action game, it is possible to designate jumping, punching, operating a weapon, etc. In a role-playing game (RPG) or a simulation RPG, it is possible to designate obtaining a game item, selecting and deciding a weapon or a command, etc. The action switch 18e, i.e. the B button is formed by a push button and utilized for changing the game mode selected by the select switch 18c, canceling the action decided by the A button, and so forth.

The action switch 18e, i.e. X button and the action switch 18f, i.e. Y button are formed by push buttons and used as auxiliary buttons in the case where it is impossible to make the game progress only with the push button A and the push button B. As a matter of course, it is not necessarily required to use the X button and the Y button in playing the game. The power switch 18h is a switch for powering on or off the game apparatus 10.

The action switch 18L (left depression button) and the action switch 18R (right depression button) are formed by push buttons. The left depression button (L button) 18L and the right depression button (R button) 18R can be used for the same operations as those with the A button 18d and the B button 18e, and also used for operations subsidiary to the A button 18d and the B button 18e.

The game apparatus 10 is also a game apparatus using a touch panel, and the LCD14 is provided with a touch panel 20 on top surface thereof. The touch panel 20 may be any one of resistance film type, optical type (infrared ray type) and electrostatic capacitive coupling type, for example. When its top surface is operated by depressing, stroking (touching) or the like with a stick 24, a pen (stylus pen) or a finger (hereinafter, referred to as "stick 24 or the like" in some cases), the touch panel 20 detects the coordinate position of the stick 24 or the like, and outputs corresponding coordinate data.

In this embodiment, a resolution of the display screen of the LCD 14 is 228 dots×192 dots (the same or the approximate same applies to the LCD 12), and a detection accuracy of the touch panel 20 is also rendered 228 dots×192 dots in correspondence to the resolution of the display screen. Alternatively, the detection accuracy of the touch panel 20 may be either lower or higher than the resolution of the display screen.

For example, the LCD 14 with the touch panel 20 displays a game screen to be viewed and operated by the player, and the LCD 12 displays a game screen to be viewed by the player. More specifically, the LCD 12 displays an image in which an object is moving on a lattice-shaped path formed by horizontal lines and vertical lines. Displayed in the game screen on the LCD 14 are only vertical lines as if the lattice is not completely prepared. The player performs an operation in such a manner as to draw horizontal lines on the touch panel 20 by touching the touch panel 20 directly with the stick 24 or the like. In this manner, the player draws on the LCD 14 the rest of the path to be displayed on the LCD 12 in order to complete the path for guiding the moving object to a predetermined position. Besides, the LCD 14 may be used for other various input operations according to the kinds of the game and, for example, it is possible to display character information, icons, etc. on the display screen of the LCD 14 so that the player can select a command.

As stated above, the game apparatus 10 has the LCD 12 and the LCD 14 as a display part of two screens, and either of them is provided with the touch panel 20 on the display screen thereof (LCD 14 in this embodiment). Thus, the game apparatus 10 has the two screens (LCDs 12 and 14) and the two operating parts (18 and 20).

Furthermore, in this embodiment, the stick 24 can be stored in a housing portion (housing slot) (not shown) provided on one side (right-of-center portion) of the upper housing 16a, for example, and taken out therefrom as necessary. In the case of not providing the stick 24, it is not necessary to provide the housing portion as well.

Also, the game apparatus 10 includes a memory card (or game cartridge) 26. The memory card 26 is detachable and inserted into a loading slot (not shown) provided on a rear surface or an upper edge (side) of the lower housing 16b. Although not shown in FIG. 1, a connector 46 (see FIG. 2) is provided in the back of the loading slot for connection with a connector (not shown) provided at a leading edge of the memory card 26 in the loading direction. When the memory card 26 is loaded into the loading slot, the connectors are connected with each other, which allows the memory card 26 to be accessible to a CPU core 42 (see FIG. 2) of the game apparatus 10.

Figure 2:
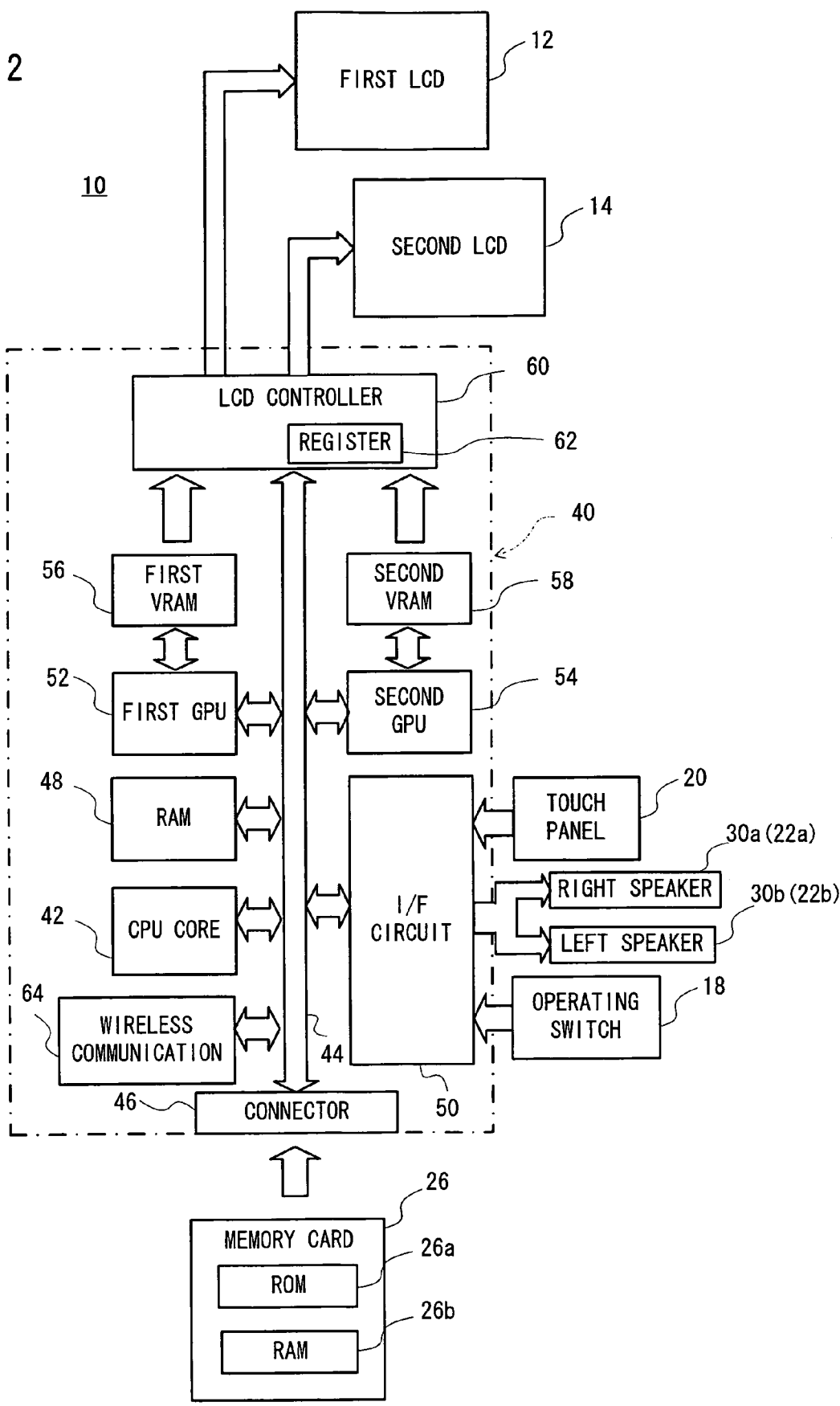
FIG. 2 is a block diagram showing one example of internal structure of the FIG. 1 exemplary embodiment.

Although not represented in FIG. 1, a right speaker 30a is provided at a position corresponding to the sound release hole 22a and a left speaker 30b is provided at a position corresponding to the sound release hole 22b inside the lower housing 16b (see FIG. 2).

Furthermore, although omitted in FIG. 1, for example, a battery accommodating box is provided on a rear surface of the lower housing 16b, and a power switch, a volume control, an external expansion connector, an earphone jack, etc. are provided on a bottom surface of the lower housing 16b.

FIG. 2 is a block diagram showing an electrical configuration of the game apparatus 10. Referring to FIG. 2, the game apparatus 10 includes an electronic circuit board 40 on which circuit components such as the CPU core 42, etc. are packaged. The CPU core 42 is connected via a bus 44 with the connector 46, a RAM 48, a first GPU (graphics processing unit) 52, a second GPU 54, an I/F circuit 50, and an LCD controller 60, and a wireless communication unit 64.

The connector 46 is detachably connected with the memory card 26 as described above. The memory card 26 includes a ROM 26a and a RAM 26b. Although not illustrated, the ROM 26a and the RAM 26b are connected with each other via a bus, and also connected with the connector (not shown) to be connected with the connector 46. Accordingly, the CPU core 42 gains access to the ROM 26a and the RAM 26b.

The ROM 26a stores in advance a game program for a game to be executed by the game apparatus 10, image data for character images, background images, item images, message images, etc., sound data for sound effects, BGM, game characters' onomatopoeic sounds. The backup RAM 26b saves data on the game in progress and data on the result of the game.

The RAM 48 is utilized as a buffer memory or a working memory. That is, the CPU core 42 loads the game program, the image data, the sound data, etc. stored in the ROM 26a of the memory card 26 into the RAM 48, and executes the loaded game program. The CPU core 42 stores in the RAM 48 temporary data such as game data and flag data in accordance with the progress of the game.

Besides, the game program, the image data, the sound data, etc. are loaded from the ROM 26a collectively at a time, or partially and sequentially as required, and are stored in the RAM 48.

Each of the GPU 52 and the GPU 54 forms a part of a rendering means and is composed of a single chip ASIC, for example. When receiving a graphics command (rendering instruction) from the CPU core 42, the GPU 52 or 54 generates game image data according to the graphics command. The CPU core 42 here provides each of the GPU 52 and the GPU 54 with an image generating program (included in the game program) required to generate the game image data, in addition to the graphics command.

Besides, data required for execution of the graphics command (image data for polygon, texture, etc.) is stored in the RAM 48 and obtained by the GPU 52 or 54.

Furthermore, the GPU 52 is connected with a VRAM 56, and the GPU 54 is connected with a VRAM 58. The GPU 52 renders the generated game image data in the VRAM 56, and the GPU 54 renders the generated game image data in the VRAM 58.

The VRAMs 56 and 58 are connected to an LCD controller 60. The LCD controller 60 includes a register 62. The register 62 is composed of one bit, for example, and stores a data value of "0" or "1" under an instruction from the CPU core 42. When the data value in the register 62 is "0", the LCD controller 60 outputs the game image data rendered in the VRAM 56 to the LCD 14, and outputs the game image data rendered in the VRAM 58 to the LCD 12. Furthermore, when the data value in the register 62 is "1", the LCD controller 60 outputs the game image data rendered in the VRAM 56 to the LCD 12, and outputs the game image data rendered in the VRAM 58 to the LCD 14.

The I/F circuit 50 is connected with the operating switch 18, the touch panel 20, the right speaker 30a and the left speaker 30b. Here, the operating switch 18 is composed of the above described switches 18a, 18b, 18c, 18d, 18e, 18f, 18g, 18h, 18L and 18R. When the operating switch 18 is operated, a corresponding operation signal (operation data) is input to the CPU core 42 via the I/F circuit 50. Coordinate data detected by the touch panel 20 is also input into the CPU core 42 via the I/F circuit 50. The CPU core 42 also reads the sound data necessary for the game such as BGM, sound effects and game characters' onomatopoeic sounds from the RAM 48, and outputs it from the right speaker 30a and the left speaker 30b via the I/F circuit 50.

When the match mode is selected, radio signals are exchanged with an opponent's game apparatus through the wireless communication unit 64. More specifically, the wireless communication unit 64 modulates communication data for the opponent into a radio signal and transmits it via an antenna (not shown), and also receives a radio signal from the opponent's game apparatus via the same antenna and demodulates it.

Figure 3:
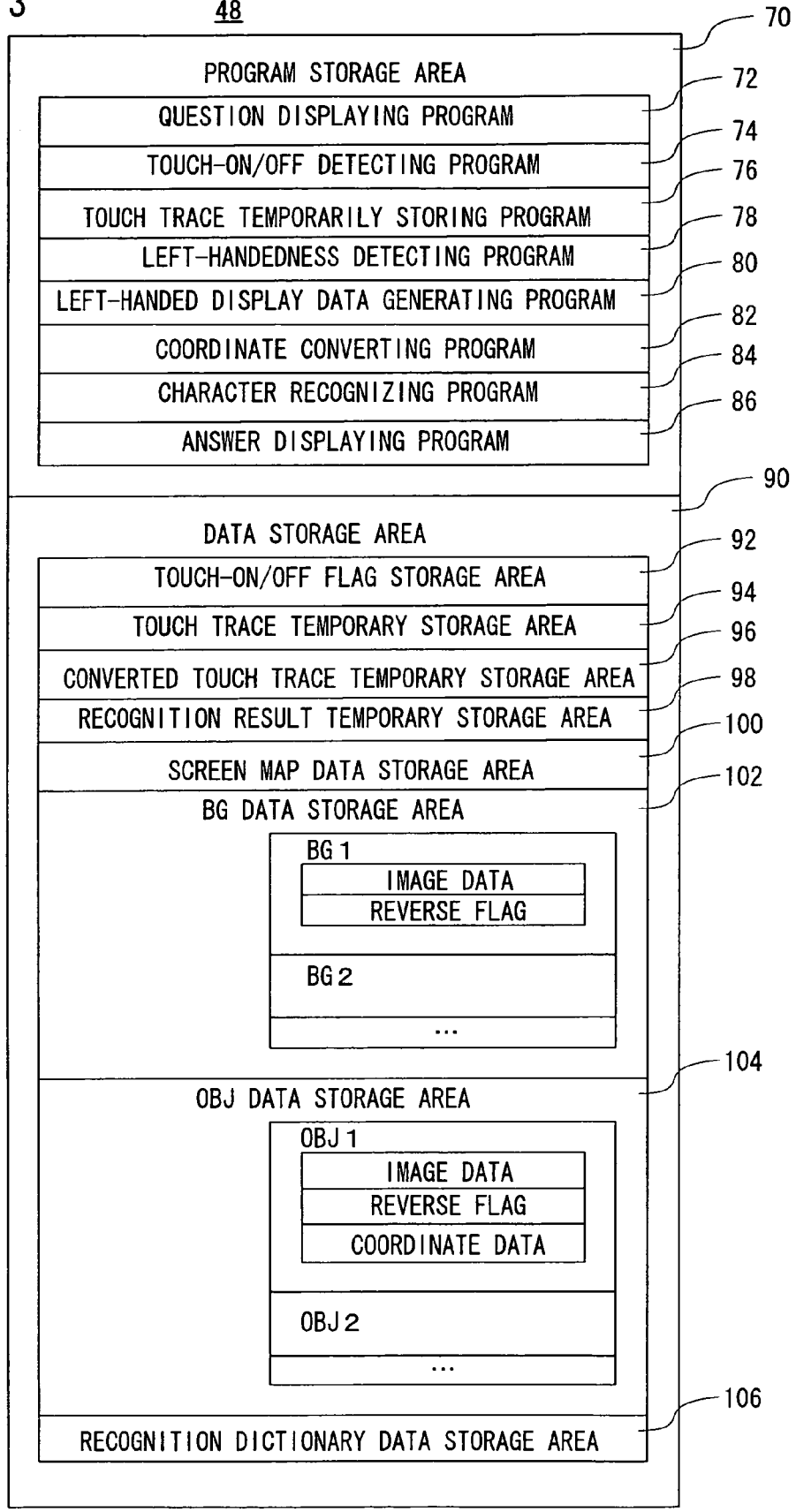
FIG. 3 is an illustrative view showing one example of mapping state of a RAM used for the FIG. 1 exemplary embodiment.

FIG. 3 shows one example of a memory map of the RAM 48. The RAM 48 includes a game program storage area 70 for storing a program loaded from the ROM 26a of the memory card 26. The program to be loaded includes a question displaying program 72, a touch-on/off detecting program 74, a touch trace temporarily storing program 76, a left-handedness detecting program 78, a left-handed display data generating program 80, a coordinate converting program 82, a character recognizing program 84, an answer displaying program 86, etc.

Besides, the program storage area 70 stores various kinds of other programs required for the progress of the game, including a program for generating/outputting game images and game sounds.

The question displaying program 72 is a program for displaying a question on the LCD 12. The touch-on/off detecting program 74 is a program for detecting a touch-on to and touch-off from the touch panel 20 and turning on/off a touch-on flag in accordance with the result of detection. The touch trace temporarily storing program 76 is a program for temporarily storing a touch trace (handwriting input data) from the touch-on to the touch-off.

The left-handedness detecting program 78 is a program for detecting left-handedness based on manipulation of the operation switch 18. The left-handed display data generating program is a program for, when left-handedness is detected, rearranging screen map data and turning on reverse flags (including a vertical reverse flag and a horizontal reverse flag). The coordinate converting program 82 is a program for, when the reverse flags are turned on, subjecting display data (including question data and answer data) and handwriting input data to coordinate conversion. The character recognizing program 84 is a program for recognizing characters corresponding to the touch trace. The answer displaying program 86 is a program for displaying an answer on the LCD 12.

The RAM 48 includes a data storage area 90. The data storage area 90 has a touch-on flag storage area 92, a touch trace temporary storage area 94, a converted touch trace temporary storage area 96, a recognition result temporary storage area 98, a screen map data storage area 100, a background (BG) data record area 102, an object (OBJ) data storage area 104, and a recognition dictionary data storage area 106.

The touch-on flag storage means 92 is an area for storing a touch-on flag. The touch-on flag is turned on by the touch-on/off detecting program 74 when a touch-on is detected, and turned off by the touch-on/off detecting program 74 when a touch-off is detected. The touch trace temporary storage area 94 is an area for temporarily storing a touch trace detected by the touch panel 20. The converted touch trace temporary storage area 96 is an area for temporarily storing the touch trace subjected to a conversion process (the converted touch trace) by the coordinate converting program 82.

The recognition result temporary storage area 98 is an area for temporarily storing result of recognition by the character recognizing program 84. The screen map data storage area 100 is an area for storing screen map data. The BG data record area 102 is an area for storing data of unit images that forms BG (background) map data. Each of BG1 data, BG2 data, ... stored in this area 102 includes image data and reverse flags. The screen map data is data showing the position at which each of the unit images (BG1, BG2, etc.) is to be displayed. For example, by storing in advance one piece of BG1 data as image data and designating the BG1 data a plurality of times on the screen map, it is possible to provide a large background image by means of just the one piece of image data.

The OBJ data storage area 104 is an area for storing OBJ (object) data. Each of OBJ1 data, OBJ2 data, ... stored in this area 102 includes image data, reverse flags and coordinate data. The OBJ data is formed by adding coordinate data to a unit image. Just by writing the coordinate data into the OBJ data, it is possible to display the OBJ image in the designated position. Accordingly, the display of certain exemplary embodiments can be easily provided either by combining screen map data and BG data for image generation or by writing coordinate data directly into OBJ data for image generation. As a matter of course, image generation may be carried out by a combination of the both methods. This related art will not be described in detail in relation to the described exemplary embodiments because it is well known to the public. Thus, these methods are mentioned in the following description without making a particular distinction between them. The recognition dictionary data storage area 106 is an area for storing recognition dictionary data referred to by the character recognition program 84.

Figure 4:
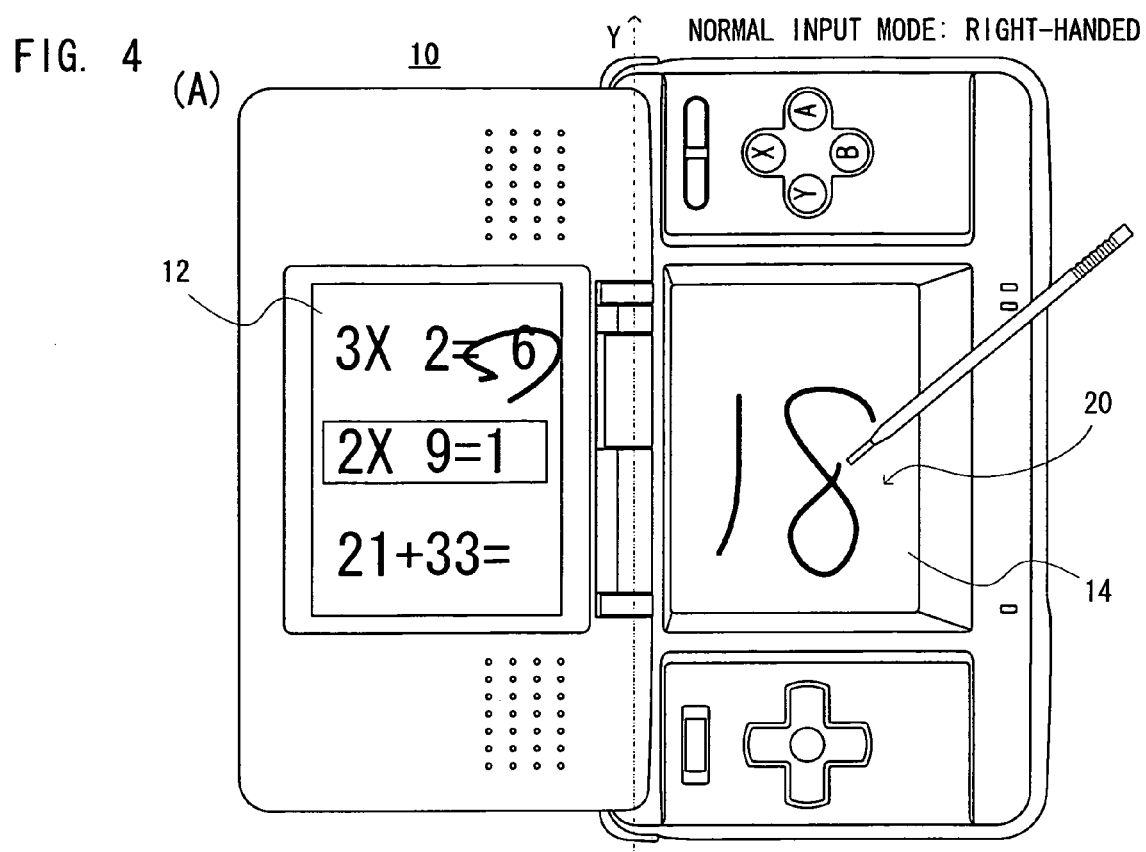
FIG. 4 (A) is an illustrative view showing an example of LCD display in a normal input mode.
Figure 4:
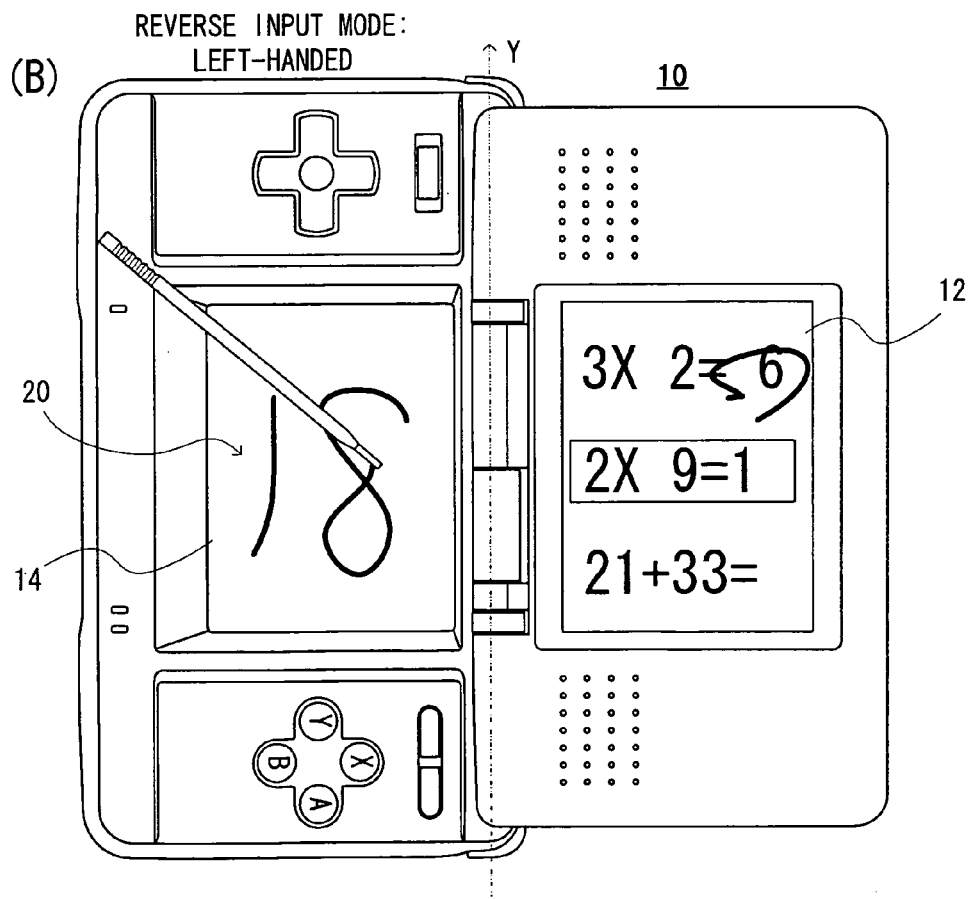

The game apparatus 10 such structured as described above is operated in a state shown in FIG. 4 (A) or FIG. 4 (B) for playing a calculation game. In the state of FIG. 4 (A), the LCD 14 equipped with the touch panel 20 is arranged on the right side of an axis Y, and the LCD 12 is arranged on the left side of the axis Y. On the contrary, in the state of FIG. 4 (B), that is, in the state where the game apparatus 10 is turned upside down, the LCD 14 is located on the left of the axis Y and the LCD 12 on the right of the axis Y.

The state of FIG. 4 (A) corresponds to the normal input mode suitable for right-handers, and the state of FIG. 4 (B) corresponds to the reverse input mode suitable for left-handers. In initial settings, the normal input mode is selected as a default. The reverse input mode can be set by performing an operation of selecting the reverse input mode via the select switch 18c.

The operation in default, i.e. normal input mode is as follows. Referring to FIG. 4 (A), upon completion of the initial settings, BG data or OBJ data corresponding to a first question "3×2=" is read from the RAM 48, and an image of "3×2=" based on the read data is displayed on the left LCD 12. When an answer "6" to the first question is drawn by the stick 24 on the right LCD 14, the path of the stick 24 is detected by the touch panel 20, and the detected touch trace is displayed on the LCD 14. Also, a character recognition process is carried out on the detected touch trace, and the recognition result "6" is displayed on the LCD 12.

Besides, the recognition result is compared with the right answer. If the result is in agreement with the right answer, the right answer mark "○" is displayed together with the result. If the result is not in agreement with the right answer, a corrected result is waited for over a predetermined time. If there is no agreement between the two even after a lapse of the time, the cursor will move to the next question.

When the process of the first question has been completed, BG data or OBJ data corresponding to a next question "2×9=" is read, and an image of "2×9=" based on the read data is displayed on the left LCD 12. When an answer "18" to the second question is drawn on the right LCD 14, the path is detected by the touch panel 20, and the detected touch trace is displayed on the LCD 14. Also, the character recognition process is carried out on the detected touch trace, and the recognition result "18" is displayed on the LCD 12.

The same process is carried out on the following questions. When all the questions have been processed, the calculation game is terminated.

The operation in the reverse input mode is as follows. Referring to FIG. 4 (B), when the reverse input mode is set, BG data or OBJ data corresponding to a first question "3×2=" is read from the RAM 48, and a coordinate conversion process is carried out on the read data. Then, an image of "3×2=" based on the converted data is displayed on the right LCD 12.

When an answer "6" to the first question is drawn by the stick 24 on the right LCD 14, the path of the stick 24 is detected by the touch panel 20, and the detected touch trace is displayed on the LCD 14. Also, a coordinate conversion process is carried out on the detected touch trace, a character recognition process is performed on the converted touch trace, and then the recognition result "6" is displayed on the LCD 12.

When the process of the first question has been completed, BG data or OBJ data corresponding to a second question "2×9=" is read, and the read data is subjected to the coordinate conversion process. Then, an image of "2×9=" based on the converted data is displayed on the LCD 12. When an answer "18" to the second question is drawn on the LCD 14, the path is detected by the touch panel 20, the touch trace is displayed on the LCD 14 and subjected to the coordinate conversion process. The converted touch trace is subjected to the character recognition process, and the recognition result "18" is displayed on the LCD 12. The same process is carried out on a third and following questions. When all the questions have been processed, the calculation game is terminated.

Figure 5:
FIG. 5 (A) to FIG. 5 (C) are illustrative views showing a part of a coordinate conversion process used for the FIG. 1 exemplary embodiment.
Figure 5:
Figure 5:
Figure 6:
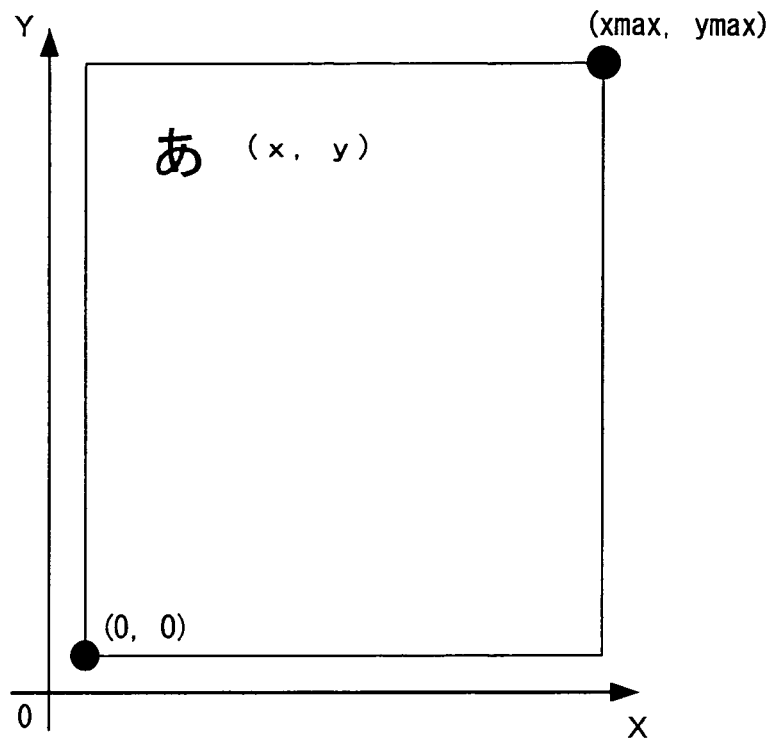
FIG. 6 (A) and FIG. 6 (B) are illustrative views showing another part of the coordinate conversion process used for the FIG. 1 exemplary embodiment.
Figure 6:
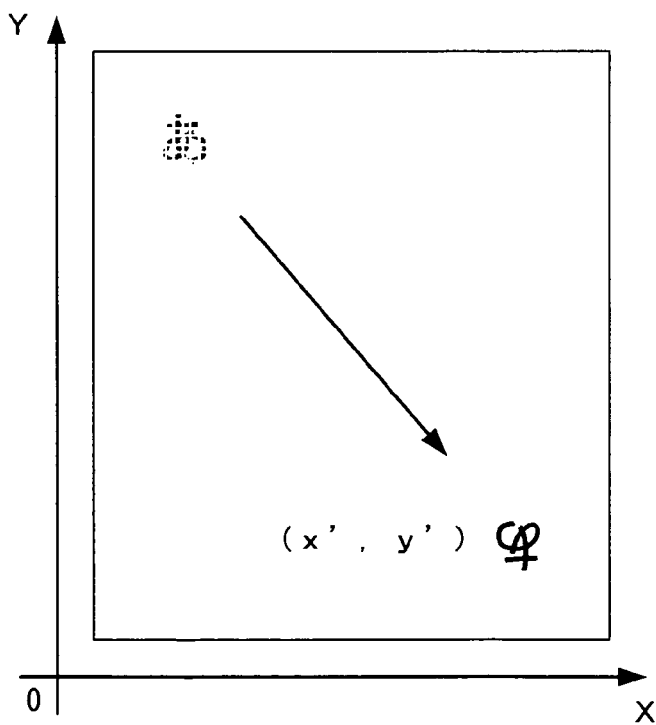

Here, in generating an image based on the OBJ data, the accompanying coordinate conversion process is carried out in such a manner as shown in FIG. 5 (A) to FIG. 5 (C), FIG. 6 (A) and FIG. 6 (B). FIG. 5 (A) to FIG. 5 (C) indicates the conversion of image data, and FIG. 6 (A) and FIG. 6 (B) shows the conversion of coordinate data. The original image data "あ" shown in FIG. 5 (A) is horizontally reversed for a start as shown in FIG. 5 (B), and then is vertically reversed as shown in FIG. 5 (C).

Meanwhile, the coordinate data (x, y) shown in FIG. 6 (A) is converted into coordinate data (x', y') shown in FIG. 6 (B) by an arithmetic operation $\{x'=xmax, y'=ymax-y\}$, with end points (0, 0) and (xmax, ymax) in the display area.

Figure 7:
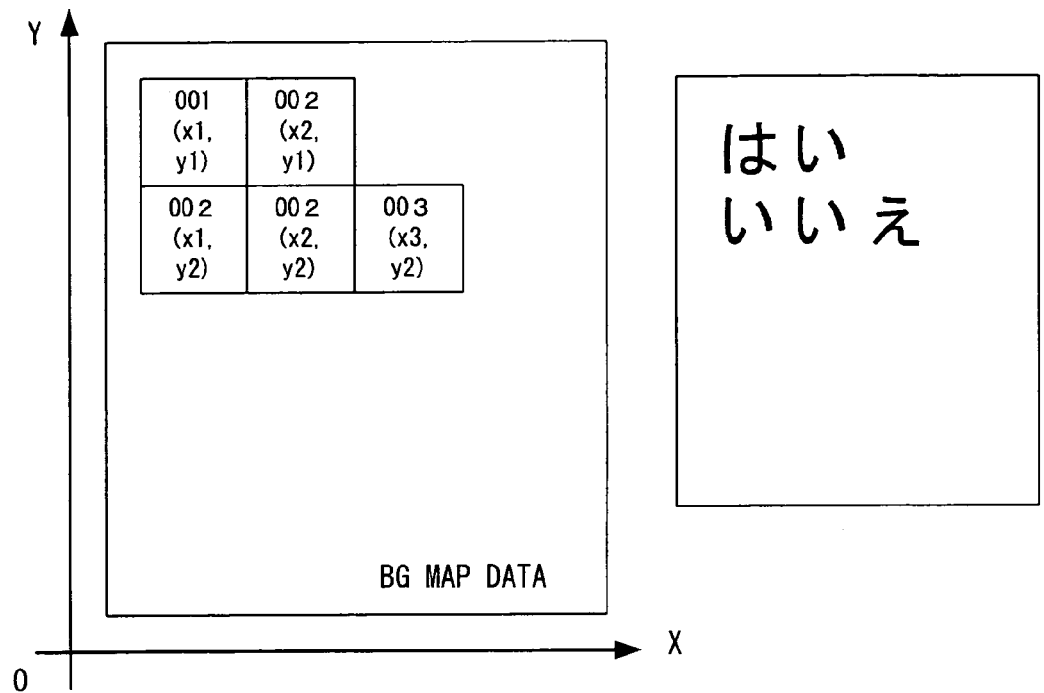
FIG. 7 (A) and FIG. 7 (B) are illustrative views showing still another part of the coordinate conversion process used for the FIG. 1 exemplary embodiment.
Figure 7:
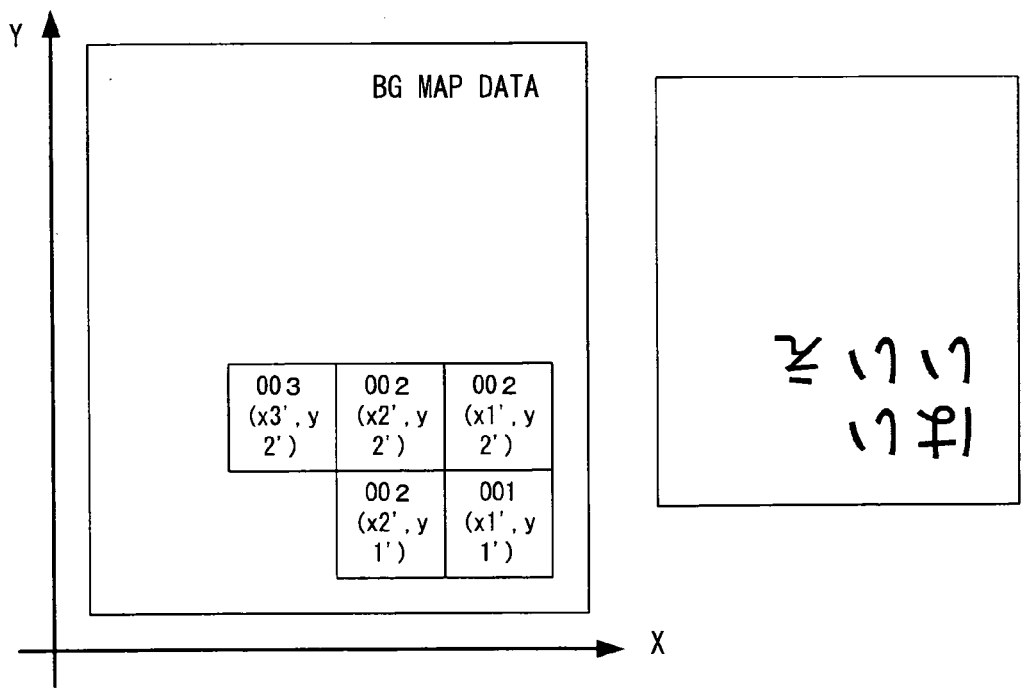

Additionally, in generating an image based on the BG data, the accompanying coordinate conversion process is carried out on the screen map data (BG map data) in such a manner as shown in FIG. 7 (A) and FIG. 7 (B). In these drawings, the BG data corresponding to the characters "は", "い" and "え" are indicated with identifiers "001", "002" and "003", respectively. The screen map data shown in FIG. 7 (A), that is, the map data for the areas corresponding to the words "はい" and "いいえ" at the upper left part of the screen are converted into BG data shown in FIG. 7 (B).

More specifically, the data "001 (x1, y1)" and "002 (x2, y1)" corresponding to "はい" are converted into "001 (x1', y1')" and "002 (x2', y1')" by an arithmetic operation {x1'=xmax-x1, y1'=ymax-y1, x2'=xmax-x2, y2'=ymax-y2, ...}. Likewise, the data "002 (x1, y2)", "002 (x2, y2)" and "003 (x3, y2)" corresponding to "いいえ" are converted into "001 (x1', y2')", "002 (x2', y2')" and "003 (x3', y2')".

Figure 8:
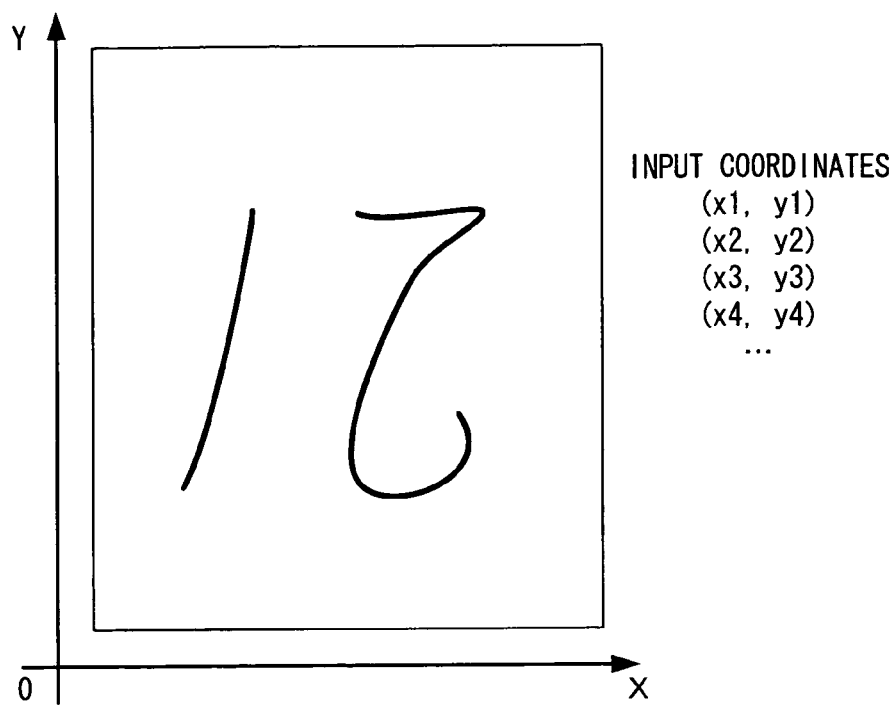
FIG. 8 (A) and FIG. 8 (B) are illustrative views showing further another part of the coordinate conversion process used for the FIG. 1 exemplary embodiment.
Figure 8:
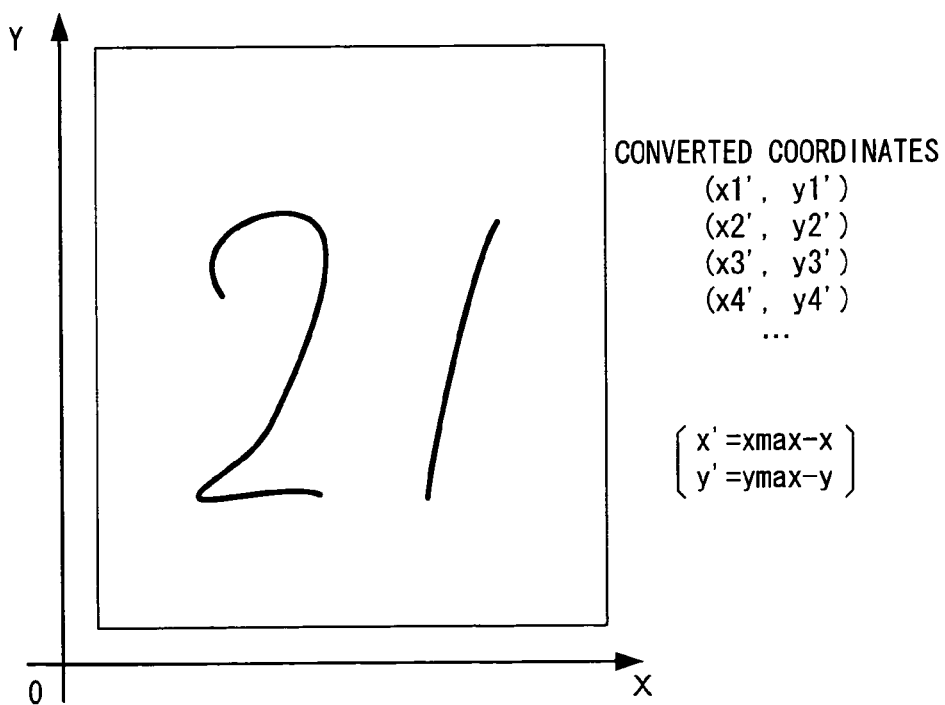

The coordinate conversion process is carried out on the touch trace (handwriting input data) in such a manner as shown in FIG. 8 (A) and FIG. 8 (B). A group of coordinate data (x1, y1), (x2, y2), (x3, y3), (x4, y4), ... indicative of the touch trace shown in FIG. 8 (A), that is, the reversed characters "21" are converted into a group of coordinate data (x1', y1'), (x2', y2'), (x3', y3'), (x4', y4'), ... indicative of the touch trace shown in FIG. 8 (B), that is, the unreversed characters "21", by an arithmetic operation {x1'=xmax-x1, y1'=ymax-y1, x2'=xmax-x2, y2'=ymax-y2, ...}.

Figure 9:
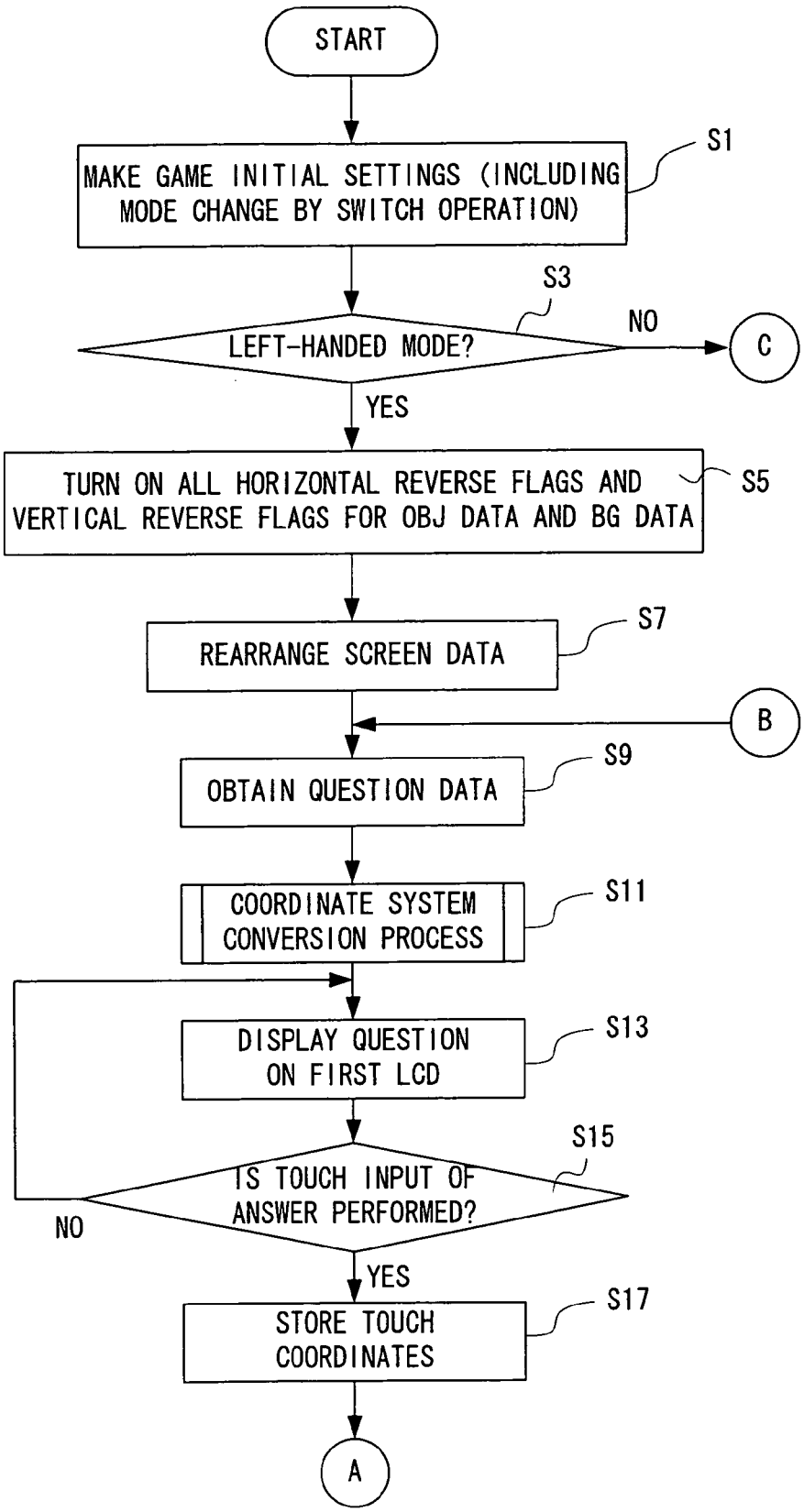
FIG. 9 is a flowchart showing a part of operation of a CPU core used for the FIG. 1 exemplary embodiment.
Figure 10:
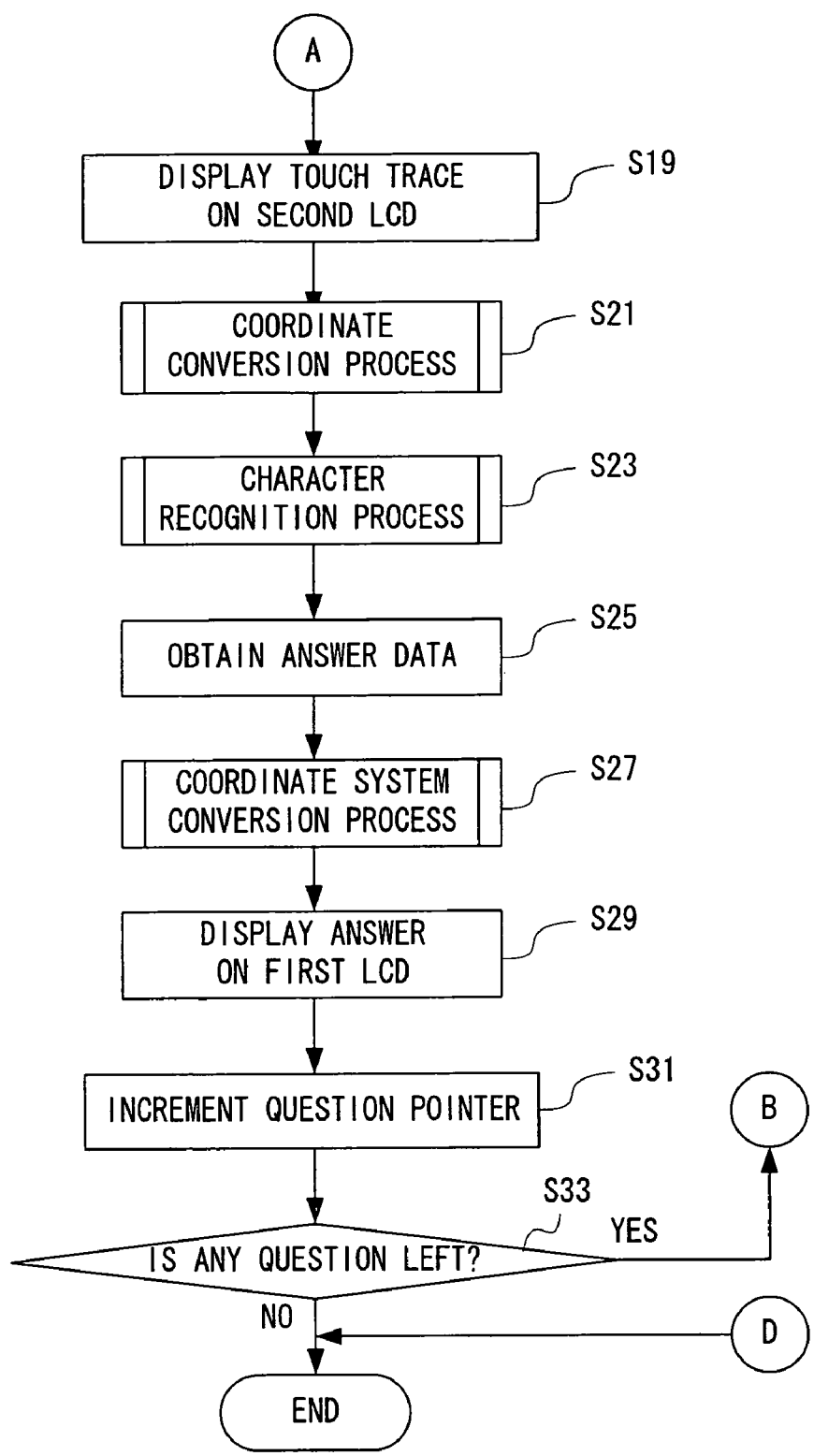
FIG. 10 is a flowchart showing another part of operation of the CPU core used for the FIG. 1 exemplary embodiment.
Figure 11:
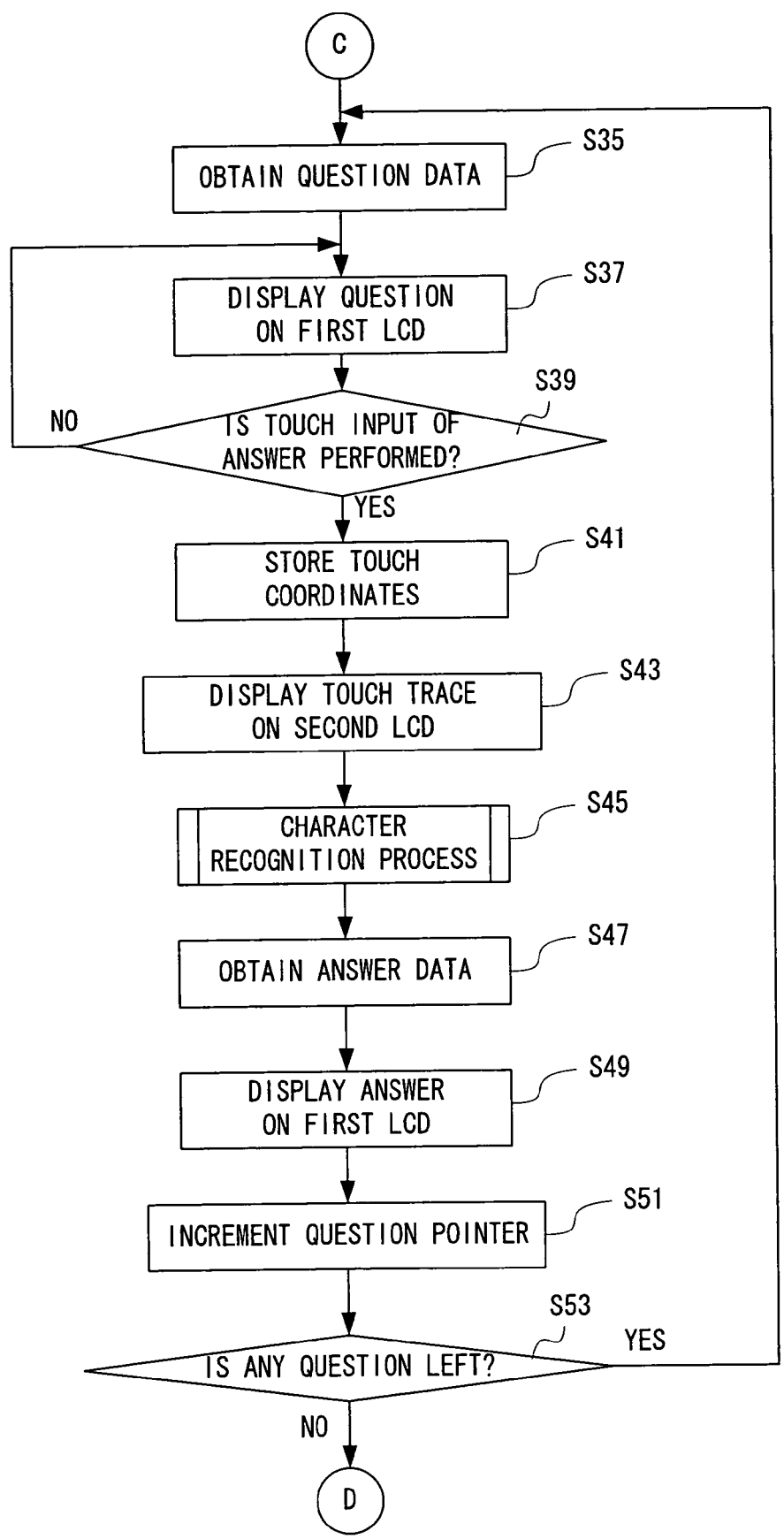
FIG. 11 is a flowchart showing still another part of operation of the CPU core used for the FIG. 1 exemplary embodiment.

The process operation of the CPU core 42 in playing the calculation game with the game apparatus 10 is described with the use of FIG. 9 to FIG. 11. Referring to FIG. 9, firstly, initial settings are made for the game in a step S1. More specifically, preparations for the start of game processes are made such as the initialization of the touch panel, the setting of default values for the operating switches and the initialization of flags, pointers, etc. used for the game processes. In a succeeding step S3, the CPU core 42 determines whether the current input mode is the reverse input mode or not. If NO, the CPU core 42 executes steps S35 to S53 (described later).

If YES in the step S3, the CPU core 42 turns on all vertical reverse flags and horizontal reverse flags for the BG data stored in the BG data storage area 102, and also turns on all vertical reverse flags and horizontal reverse flags for the OBJ data stored in the OBJ data storage area 104. In a step S7, the CPU core 42 rearranges screen map data stored in the screen data storage area 100.

In a step S9, the CPU core 42 obtains data designated by the pointer, that is, BG data and OBJ data for a question to be next presented, from the BG data storage area 102 and the OBJ data storage area 104, respectively.

In a step S11, the CPU core 42 subjects the obtained BG/OBJ data to the coordinate conversion process. This process includes the arithmetic operation {x'=xmax, y'=ymax-y}. Accordingly, image data forming the BG/OBJ data, for example, an image of the character "あ" shown in FIG. 5 (A) is reversed vertically and horizontally as shown in FIG. 5 (C). Likewise, coordinate data forming the OBJ data, for example, (x, y) shown in FIG. 6 (A) is converted into (x', y') as shown in FIG. 6 (B).

In a step S13, the CPU core 42 displays on the LCD 12 a question image based on the converted BG/OBJ data. In a step S15, the CPU core 42 determines whether or not a touch input has been performed to the touch panel 20. If NO, the process returns to the step S13. Additionally, the presence or absence of a touch input is determined according to the touch-on/off flag.

If YES in the step S15, the CPU core 42 stores a touch trace detected by the touch panel 20 in the touch trace temporary storage area 94 in a step S17. Then, the process moves to a step S19.

Referring to FIG. 10, in the step S19, the CPU core 42 displays on the LCD 14 a touch trace stored in the touch trace temporary storage area 94, that is, a touch trace based on a group of coordinate data (x1, y1), (x2, y2), .... In a step S21, the CPU core 42 subjects the touch trace stored in the touch trace temporary area 94 to the coordinate conversion process. This process includes the arithmetic operation {x1'=xmax-x1, y1'=ymax-y1, x2'=xmax-x2, y2'=ymax-y2, ...}. Accordingly, the group of coordinate data forming the touch trace (x1, y1), (x2, y2), ... is converted into a group (x1', y1'), (x2', y2'), ... (see FIG. 8 (A) and FIG. 8 (B)). The converted coordinate data group, that is, the converted touch trace is stored in the converted touch trace temporary storage area 96.

In a step S23, the CPU core 42 performs the character recognition process on the converted touch trace stored in the converted touch trace temporary storage area 96. Accordingly, the characters "21" are recognized from the touch trace shown in FIG. 8 (A), for example. The result of the process of step S23, i.e. character information, is stored in the recognition result temporary storage area 98.

Upon completion of the character recognition, the process moves to a step S25 to obtain the character information stored in the recognition result temporary storage area 98, i.e. BG/OBJ data for an answer. In a step S27, the CPU core 42 subjects the obtained BG/OBJ data to the coordinate conversion process. This process includes the same arithmetic operation as in the step S11. In a step S29, the CPU core 42 displays on the LCD 12 an answer image based on the converted BG/OBJ data.

In a step S31, the CPU core 42 increments the pointer for designating a question. In a step S33, the CPU core 42 determines whether or not there exists any question yet to be presented. If concluding to be YES, the CPU core 42 returns the process to the step S9. If concluding to be NO in the step S33, the CPU core 42 terminates this game process.

If concluding to be NO in the step S3, the CPU core 42 performs such a process as described below. Referring to FIG. 11, in a step S35, the CPU core 42 obtains the BG data and the OBJ data for a next question, that is, the BG data and the OBJ data designated by the pointer, from the BG data storage area 102 and the OBJ data storage area 104, respectively. In a step S37, the CPU core 42 displays on the LCD 12 a question image based on the obtained BG/OBJ data. In a step S39, the CPU core 42 determines whether or not a touch input has been performed to the touch panel 20. If NO, the CPU core 42 returns the process to the step S37.

If YES in the step S39, the CPU core 42 stores a touch trace detected by the touch panel 20 in the touch trace temporary storage area 94 in a step S41. In a step S43, the CPU core 42 displays on the LCD 14 a touch trace detected by the touch panel. In a step S45, the CPU core 42 performs the character recognition process on the touch trace within the touch trace temporary storage area 94. The result of the process of step S45, that is, the character information, is stored in the recognition result temporary storage area 98.

In a step S47, the CPU core 42 obtains BG/OBJ data corresponding to the character information in the recognition result temporary storage area 98, that is, an answer. In a step S49, the CPU core 42 displays on the LCD 12 an answer image based on the obtained BG/OBJ data. In a step S51, the CPU core 42 increments the pointer indicating a question.

In a step S53, the CPU core 42 determines whether or not there exists any question yet to be presented. If concluding to be YES, the CPU core 42 returns the process to the step S35. If concluding to be NO in the step S53, the CPU core 42 ends this game process.

As understood from the above description, the game apparatus 10 of this embodiment has the first LCD 12 and the second LCD 14 arranged on respective left and right sides with respect to a predetermined axis (Y: see FIG. 4 (A) and FIG. 4 (B)) and the touch panel 20 provided on the second display 14. The CPU core 42 of the game apparatus 10 processes touch input programs corresponding to FIG. 9 to FIG. 11 (including the programs 72 to 86 listed in FIG. 3).

The reverse input mode is set in the step S1 in response to a switch operation. It is determined in the step S3 whether the reverse input mode is set or not. If the result of determination in the step S3 is affirmative, the BG/OBJ data corresponding to the question is reversed in the step S11 (see FIG. 5 (A) to FIG. 5 (C), FIG. 6 (A), FIG. 6 (B), FIG. 7(A) and FIG. 7 (B)). The image based on the reversed BG/OBJ data is displayed on the first LCD 12 in the step S13.

The handwriting input operation associated with the image displayed in the step S13 is accepted through the touch panel 20 in the step S17. The image based on the handwriting input data corresponding to the handwriting input operation accepted in the step S17 is displayed on the second LCD 14 in the step S19.

In the step S21, the handwriting input data corresponding to the handwriting input operation accepted in the step S17 is reversed (see FIG. 8 (A) and FIG. 8 (B)). In the step S23, the character recognition process is performed on the basis of the reversed handwriting input data.

In the step S27, the character information recognized by the process of the step S23, that is, the BG/OBJ data corresponding to the answer is reversed vertically and horizontally. In the step S29, the image based on the BG/OBJ data reversed in the step S27 is further displayed on the first LCD 12.

As stated above, in response to the setting of the reverse input mode, the BG/OBJ data corresponding to the question is reversed, the image based on the reversed BG/OBJ data is displayed on the first LCD 12, and the handwriting input operation associated with the image is accepted. Accordingly, the image based on the handwriting input data corresponding to the accepted handwriting input operation, that is, the image based on the unreversed handwriting input data is displayed on the second LCD 14. Thus, the touch trace will never be displayed upside down on the game apparatus 10 that is turned upside down (see FIG. 4 (B)). This allows a left-handed operator to perform an accurate handwriting input operation.

Moreover, the handwriting input data is reversed vertically and horizontally, and the character recognition process is performed on the basis of the reversed handwriting input data. This makes it possible perform the appropriate character recognition process.

Furthermore, the BG/OBJ data corresponding to the recognized character information, that is, the answer, is reversed vertically and horizontally, and the image based on the reversed data is further displayed on the first LCD 12. This makes it easy to verify whether the handwriting input operation is accurate or not and whether the answer to the question is correct or not.

Besides, the above description is intended for the case in which the described exemplary embodiments are applied to the game apparatus 10, as an example. The described exemplary embodiments are applicable to every kind of touch input device that has two displays arranged in such a manner that their main axes are in parallel to each other and a touch panel provided on either of the two displays.

Although the certain exemplary embodiments have been described and illustrated in detail, it is clearly understood that the same is by way of illustration and example only and is not to be taken by way of limitation, the spirit and scope of the certain exemplary embodiments being limited only by the terms of the appended claims.

What is claimed is:

1. A computer-readable storage medium storing a touch input program to be executed by a processor of a touch input device having a first display and a second display arranged on respective left and right sides with respect to a predetermined axis and a touch panel provided on said second display, said touch input program comprising:
   a setting step, setting a reverse input mode in response to a predetermined operation;
   a determining step, determining whether or not the reverse input mode is set in said setting step;
   a first reversing step, reversing first character data vertically and horizontally when result of determination in said determining step is affirmative;
   a first displaying step of displaying an image based on the first character data reversed in said first reversing step;
   a first accepting step, accepting through said touch panel a handwriting input operation associated with the image displayed in said first displaying step; and
   a second displaying step, displaying on said second display an image based on handwriting input data corresponding to the handwriting input operation accepted in said first accepting step.

2. A computer-readable storage medium according to claim 1, wherein
said touch input program further comprises:
   a second reversing step, reversing vertically and horizontally handwriting input data corresponding to the handwriting input operation accepted in said first accepting step; and
   a first processing step, executing a character recognition process based on the handwriting input data reversed in said second reversing step.

3. A computer-readable storage medium according to claim 2, wherein
said touch input program further comprises:
   a third reversing step, reversing second character data corresponding to the character information recognized by the process of said first processing step; and
   a third displaying step, further displaying on said first display an image based on the second character data reversed in said third reversing step.

4. A computer-readable storage medium according to claim 3, wherein
said touch input program further comprises:
   a fourth displaying step, displaying an image based on said first character data when the determination result in said determining step is negative;
   a second accepting step, accepting through said touch panel a handwriting input operation associated with the image displayed in said fourth displaying step;
   a fifth displaying step, displaying on said second display an image based on the handwriting input data corresponding to the handwriting input operation accepted in said second accepting step;
   a second processing step, executing said character recognition process based on the handwriting input data corresponding to the handwriting input operation accepted in said second accepting step; and
   a sixth displaying step, further displaying on said first display an image based on third character data corresponding to the character information recognized by the process of said second processing step.

5. A touch input device, comprising:
a first display and a second display arranged on respective left and right sides with respect to a predetermined axis;
a touch panel provided on said second display;
a setting means for setting a reverse input mode in response to a predetermined operation;

a determining means for determining whether or not the reverse input mode is set by said setting means;

a first reversing means for reversing first character data vertically and horizontally when result of determination by said determining means is affirmative;

a first displaying means for displaying an image based on the first character data reversed by said first reversing means;

a first accepting means for accepting through said touch panel a handwriting input operation associated with the image displayed by said first displaying means; and a second displaying means for displaying on said second display an image based on handwriting input data corresponding to the handwriting input operation accepted by said first accepting means.

6. A touch input device according to claim 5, further comprising:

a second reversing means for reversing vertically and horizontally handwriting input data corresponding to the handwriting input operation accepted by said first accepting means; and a first processing means for executing a character recognition process based on the handwriting input data reversed by said second reversing means.

7. A touch input device according to claim 6, further comprising:

a third reversing means for reversing second character data corresponding to the character information recognized by the process of said first processing means; and a third displaying means for further displaying on said first display an image based on the second character data reversed by said third reversing means.

8. A touch input device according to claim 7, further comprising:

a fourth displaying means for displaying an image based on said first character data when the result of determination by said determining means is negative;

a second accepting means for accepting through said touch panel a handwriting input operation associated with the image displayed by said fourth displaying means;

a fifth displaying means for displaying on said second display an image based on the handwriting input data based on the handwriting input operation accepted by said second accepting means;

a second processing means for executing said character recognition process based on the handwriting input data corresponding to the handwriting input operation accepted by said second accepting means; and a sixth displaying means for further displaying on said first display an image based on third character data corresponding to the character information recognized by the process of said second processing means.

9. A touch input method for a touch input device having a first display and a second display arranged on respective left and right sides with respect to a predetermined axis and a touch panel provided on said second display, comprising:

a setting step of setting a reverse input mode in response to a predetermined operation;

a determining step of determining whether or not the reverse input mode is set in said setting step;

a first reversing step of reversing a first character data vertically and horizontally when result of determination in said determining step is affirmative;

a first displaying step of displaying an image based on the first character data reversed in said first reversing step;

a first accepting step of accepting through said touch panel a handwriting input operation associated with the image displayed in said first displaying step; and a second displaying step of displaying on said second display an image based on handwriting input data corresponding to the handwriting input operation accepted in said first accepting step.

10. A touch input method according to claim 9, further comprising:

a second reversing step, reversing vertically and horizontally handwriting input data corresponding to the handwriting input operation accepted in said first accepting step; and a first processing step, executing a character recognition process based on the handwriting input data reversed in said second reversing step.

11. A touch input method according to claim 10, further comprising:

a third reversing step, reversing second character data corresponding to the character information recognized by the process of said first processing step; and a third displaying step, further displaying on said first display an image based on the second character data reversed in said third reversing step.

12. A touch input method according to claim 11, further comprising:

a fourth displaying step, displaying an image based on said first character data when the determination result in said determining step is negative;

a second accepting step, accepting through said touch panel a handwriting input operation associated with the image displayed in said fourth displaying step;

a fifth displaying step, displaying on said second display an image based on the handwriting input data based on the handwriting input operation accepted in said second accepting step;

a second processing step, executing said character recognition process based on the handwriting input data corresponding to the handwriting input operation accepted in said second accepting step; and a sixth displaying step, further displaying on said first display an image based on third character data corresponding to the character information recognized by the process of said second processing step.

13. A touch input device, comprising:

a first display and a second display arranged on respective left and right sides with respect to a predetermined axis;

a touch panel provided on said second display;

setting programmed logic circuitry for setting a reverse input mode in response to a predetermined operation;

determining programmed logic circuitry for determining whether or not the reverse input mode is set by said setting means;

first reversing programmed logic circuitry for reversing first character data vertically and horizontally when result of determination by said determining programmed logic circuitry is affirmative;

first displaying programmed logic circuitry for displaying an image based on the first character data reversed by said first reversing programmed logic circuitry;

first accepting programmed logic circuitry for accepting through said touch panel a handwriting input operation associated with the image displayed by said first displaying programmed logic circuitry; and second displaying programmed logic circuitry for displaying on said second display an image based on handwriting input data corresponding to the handwriting input operation accepted by said first accepting programmed logic circuitry.

* * * * *